J. T. CADENHEAD.
DEMOUNTABLE RIM.
APPLICATION FILED AUG. 26, 1919.
1,363,952.
Patented Dec. 28, 1920.
3 SHEETS—SHEET 1.
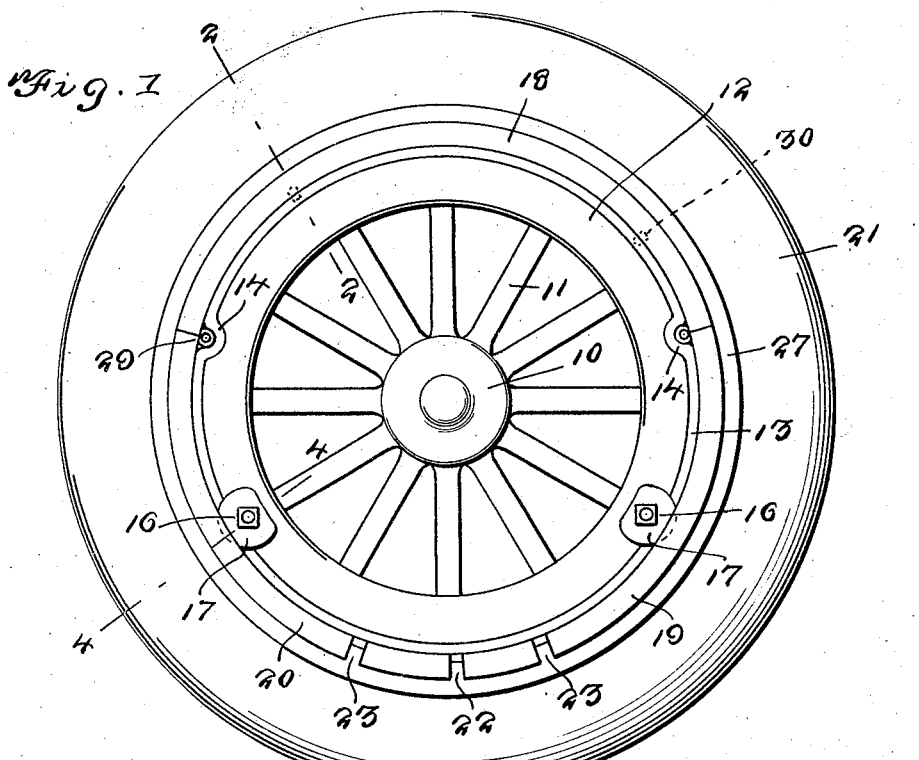
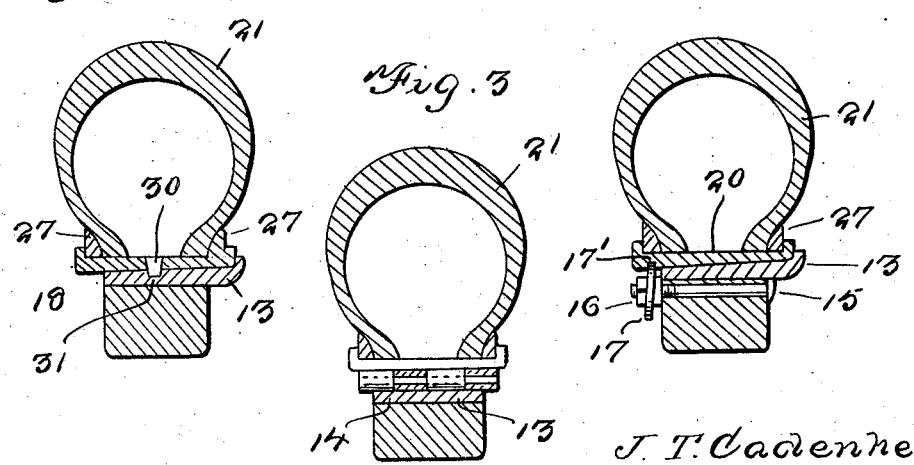
J. T. Cadenhead
INVENTOR.
BY
Victor J. Evans
ATTORNEY.
WITNESS:
E. R. Ruppert

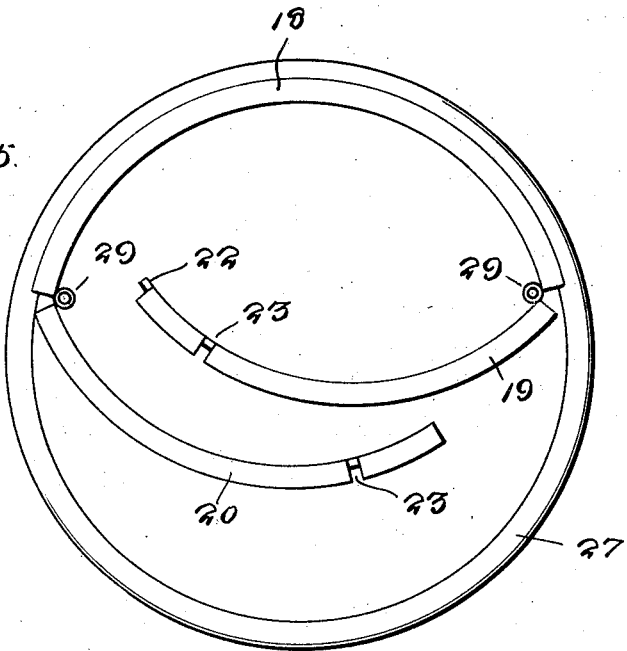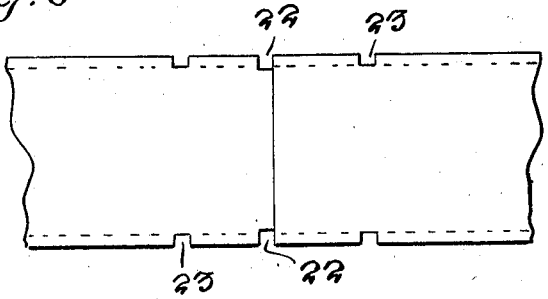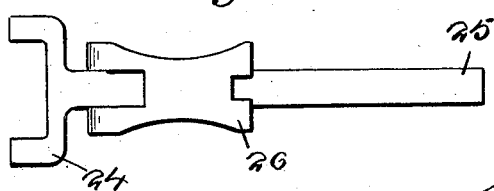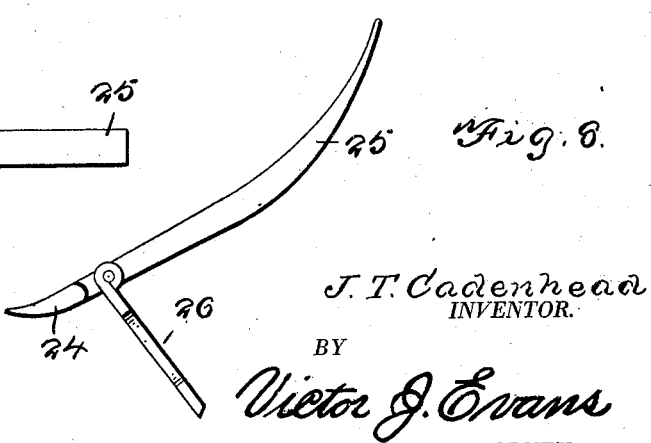

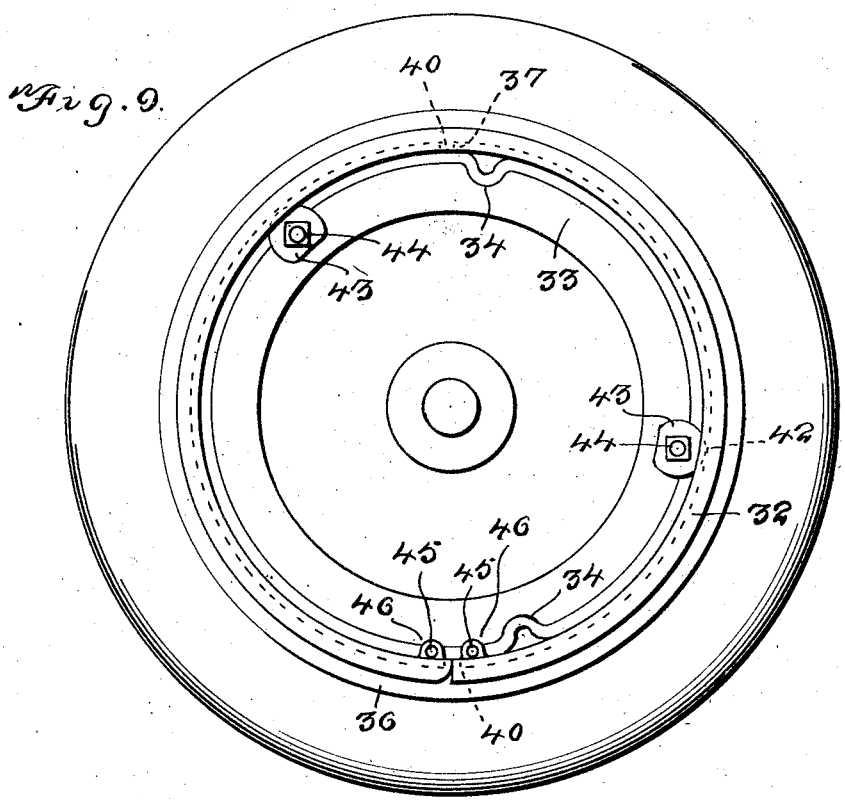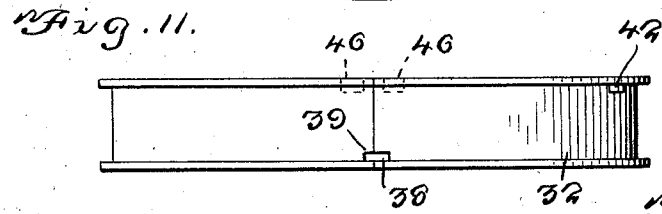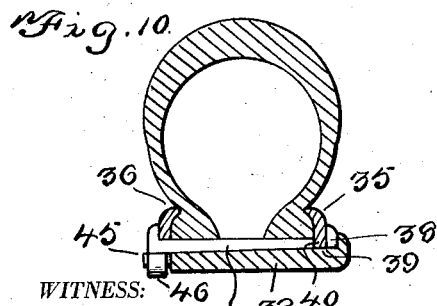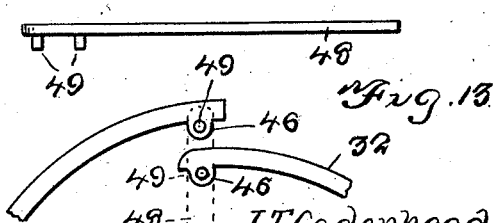

UNITED STATES PATENT OFFICE.

JOHN TYLER CADENHEAD, OF ENSLEY, ALABAMA.

DEMOUNTABLE RIM.

1,363,952. Specification of Letters Patent. Patented Dec. 28, 1920.

Application filed August 26, 1919. Serial No. 320,066.

*To all whom it may concern:*

Be it known that I, JOHN T. CADENHEAD, a citizen of the United States, residing at Ensley, in the county of Jefferson and State of Alabama, have invented new and useful Improvements in Demountable Rims, of which the following is a specification.

This invention relates to demountable rims and comprehends a construction which can be used with either a clencher or straight side casing. To this end, the invention makes use of a split rim and tire locking rings which may be readily associated with or separated from the rim as the occasion requires.

An important object of the invention resides in the provision of a split rim having slots formed therein and in the meeting ends of the rim, and adapted to receive lugs carried by one of the tire locking rings, the lugs serving to hold the ring properly positioned upon the rim, and also serving as a lock against accidental breaking or collapsing of the rim.

Another object of importance resides in the provision of a rim designed to accommodate a particular tool utilized to break or collapse the rim prior to removing or applying the tire.

In one of the embodiments of the invention the rim is made up of a plurality of hingedly connected sections to facilitate the association of the tire with the rim, or the disassemblage of the parts, the hinged joints being seated in grooves in the felly which serve to prevent creeping or circumferential movement of the rim with relation to the wheel.

Other objects and advantages will appear when the following detail description is taken in connection with the accompanying drawings, the invention residing in the construction, combination and arrangement of parts as claimed.

In the drawings forming part of this specification like numerals of reference indicate similar parts in the several views and wherein:

Figure 1 is a side elevation of a wheel and rim constructed in accordance with one embodiment of the invention.

Fig. 2 is a transverse sectional view taken on line 2—2 of Fig. 1.

Fig. 3 is a sectional view taken transversely of the hinged joints and grooves therefor.

Fig. 4 is a transverse sectional view taken on line 4—4 of Fig. 1.

Fig. 5 is a side elevation of the rim removed from the wheel showing certain sections collapsed.

Fig. 6 is a fragmentary plan view of the adjacent or meeting ends of the rim.

Fig. 7 is a side elevation of a tool used in connection with this form of the invention for collapsing the rim.

Fig. 8 is a plan view thereof.

Fig. 9 is a side elevation of a modified form of the invention.

Fig. 10 is a transverse sectional view taken through Fig. 9.

Fig. 11 is a view of the rim.

Fig. 12 is a view of the tool used in connection with this form of the invention for breaking or collapsing the rim.

Fig. 13 is a fragmentary detail view showing the manner of using the tool.

Referring to the drawings in detail 10 indicates the hub of the wheel which is connected by means of the spokes 11 to the felly 12. A metallic band 13 is fitted upon the felly and provided at spaced intervals with transversely extending grooves 14 for the purpose to be presently described. This band 13 is slightly tapered from one side to the other, and reverse to the taper of the demountable rim illustrated in Fig. 5, so that when the rim is seated upon the wheel the parts are slightly wedged. Headed bolts 15 are passed through the felly 12 and are threaded adjacent one end to accommodate nuts 16. Each nut is provided with a spiral flange 17 which effectively engages the adjacent portion of the band 13 when the nuts 16 are tightened. It will be noted upon reference to Fig. 4, that the rim projects a slight distance beyond one side edge of the band 13, and is provided with slots 17′ in which the spiral flanges 17 are adapted to be received.

The tire carrying rim is made up of an intermediate section 18 and two end sections 19 and 20 respectively which are hingedly connected to the adjacent ends of the intermediate section 18. This construction obviously facilitates the association of the rim and tire 21, or the removal of the tire from the rim as the occasion requires. For either of these purposes, the end sections of the rim can be broken from their hinged joints and arranged in the manner disclosed in Fig. 5. The end section 20 is terminally provided with notches 22, while both the sections 19 and 20 adjacent their meeting edges are provided with notches 23, all of said notches being provided to accommodate the tool disclosed in Figs. 7 and 8, and used to collapse the rim, or to adjust the sections thereof to rim forming positions. To collapse the rim, the forked extremity 24 of the tool disclosed in Fig. 7 is inserted in the notches 22 of the end section 20, and by pressing upon the handle 25 of said tool, the section 20 moves inwardly, thus permitting the sections 19 and 20 to be arranged in overlapping relation. When the rim is thus collapsed, the tire can be conveniently removed from the rim or applied thereto. To return the sections 19 and 20 to rim forming positions, the forked extremity 24 of the tool is inserted in the notches 23 of the end section 19 arranging the hinged member 26 of said tool against the end of the adjacent end section, so that when the handle 25 is operated, the said sections 19 and 20 will be moved into place. As shown in Fig. 5, one of the two tire locking rings 27 is secured to the intermediate section 18 of the rim, while the other of said rings for the opposite side of the wheel is removable therefrom.

In associating or placing the tire carrying rim upon the felly of the wheel, the hinged joints 29 of said rim sections are placed within the grooves 14, whereby said hinged joints assist in preventing creeping or circumferential movement of the rim with respect to the wheel. For this purpose the rim sections are also provided with pins 30 adapted to be received within openings 31 provided in the band 13.

In Fig. 9 I have shown a modified form of the invention wherein the demountable rim is of the usual construction and indicated at 32. The felly 33 of the wheel is provided with grooves 34, so that a rim of the type hereinabove described having hinged joints may be used, in which instance the hinged joints are adapted to be arranged within the grooves 34. The rim shown in this instance is designed for use with either a clencher or straight side casing. Tire locking rings 35 and 36 respectively are detachably associated with the rim 32. The rim at a point diametrically opposite from the meeting ends of the rim, or substantially so, is provided with a slot 37, while the meeting ends are cut away as at 38, these cut away portions unitedly defining a slot 39. The tire locking ring 35 is provided with lugs 40 adapted to be received within the slots 37 and 39 respectively, a construction whereby the ring is held fixed relatively to the rim. It will be further noted that the lug arranged within the slot 39 serves as a lock for the rim to prevent casual breaking or collapsing of the rim. The rim adjacent the opposite side is provided with spaced slots 42 adapted to receive flanges 43 carried by the headed bolts 44 which are adjustably associated with the felly of the wheel. Manifestly the flanges 43 when positioned within said slots serve to hold the rim fixed upon the felly. Spaced pins 45 are provided on one edge of the felly band 33, Figs. 9 and 10, and when the rim 32 is slipped on the felly-band 33, the said pins 45 are received in the eyes 46 on the rim 32, the ends of the said rim being at that time in opposed relation, Fig. 9. Manifestly the pins 45 will preclude creeping of the rim 32 about the felly-band 33, and will not interfere in any measure with the lateral removal of the rim from the felly band. When the rim 32 is removed laterally from the felly-band 33, the eyes 46 serve for the engagement of the tool for manipulating—i. e., collapsing or contracting and expanding the rim 32 which is necessarily resilient in character.

In Figs. 12 and 13 I have disclosed the tool used for contracting or collapsing and expanding the rim. The tool is in the nature of a lever 48, from one side of which projects spaced lugs 49. The manner of using the tool is shown in Fig. 13, wherein the lugs 49 are positioned within the eyes 46, subsequently to the removal of the rim from the felly, and by pulling down upon the lever 48 to reverse its position, one end of the rim is lowered and moved into a position wherein the ends are overlapped. The tool remains associated with the rim while the tire is being removed therefrom or associated therewith, it being understood that the rim can be expanded to properly position the ends by reversing the position of the lever 48.

What I claim is:—

1. In a demountable rim construction, the combination of a felly-band having lateral spaced pins, and a split, resilient, radially-contractible, demountable rim having at its inner side adjacent to its ends eyes that receive said pins when the rim is positioned on the felly-band to prevent creeping of the rim about the felly-band, and are adapted when the rim is removed from the felly-band to receive portions of a tool for contracting or collapsing and expanding the rim.

2. In a demountable rim construction, tire-locking rings one of which is provided with an inwardly-reaching lug, in combination with a split, resilient, radially-contractible demountable rim having exterior flanges to rest at the outer sides of the rings and an aperture to receive the lug of one ring and also having at its inner side adjacent to its ends devices for the engagement of a manipulating tool; one end portion of said rim being movable longitudinally and radially to and from an inner position in lapped and spaced relation to the other end portion thereof.

In testimony whereof I affix my signature.

JOHN TYLER CADENHEAD.